United States Patent [19]

Yamabe et al.

[11] Patent Number: 4,631,075
[45] Date of Patent: Dec. 23, 1986

[54] COMPOSITE MEMBRANE FOR GAS SEPARATION

[75] Inventors: Masaaki Yamabe, Machida; Shigeyoshi Kobayashi, Kawasaki; Noriyuki Yoshihara, Yokohama; Masaru Nakamura, Setagaya, all of Japan

[73] Assignee: Asahi Glass Company Ltd., Tokyo, Japan

[21] Appl. No.: 599,334

[22] Filed: Apr. 12, 1984

[30] Foreign Application Priority Data

Apr. 26, 1983 [JP] Japan .................................. 58-72210

[51] Int. Cl.$^4$ ............................................. B01D 53/22
[52] U.S. Cl. .................. 55/158; 210/500.27
[58] Field of Search .................... 264/216; 55/16, 158; 210/500.2

[56] References Cited

U.S. PATENT DOCUMENTS 4,230,463 10/1980 Henis et al. ......................... 55/71 X
4,279,855 7/1981 Ward, III ......................... 264/216 X
4,439,217 3/1984 Yamabe et al. ......................... 55/158

Primary Examiner—Frank Spear
Attorney, Agent, or Firm—Oblon, Fisher, Spivak, McClelland, & Maier

[57] ABSTRACT

A composite membrane for gas separation having a three-layered structure comprising:
(A) a porous polymer supporting membrane layer having a cross-sectional oxygen permeation flux of at least 5 m$^3$/m$^2$.hr.atm (STP) and having an asymmetric porous structure such that the average pore diameter at one surface is from 5 to 500 Å and the average pore diameter at the other surface is greater than that at said one surface;
(B) a polyorganosiloxane layer having a thickness of from 300 Å to 5 μm; and
(C) a thin layer having a thickness of from 100 to 5000 Å and made of a polymer containing monomer units of at least one monomer selected from the group consisting of fluoroolefin monomers and pivalate

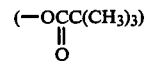

group-containing monomers, being soluble in an organic solvent and having an O$_2$/N$_2$ permeability coefficient ratio of at least 3.5;
said layer B contacting said one surface with the smaller pore diameter of the layer A, said layer C contacting the surface of the layer B, and the composite membrane having an oxygen permeation flux of at least 0.1 m$^3$/m$^2$.hr.atm (STP) and an O$_2$/N$_2$ permeation flux ratio of at least 2.5.

9 Claims, No Drawings

COMPOSITE MEMBRANE FOR GAS SEPARATION

The present invention relates to a composite membrane for gas separation and more particularly to a composite membrane useful for separating and concentrating oxygen in the air.

For instance, oxygen for medical use is available in the form of pure oxygen stored in a bombe, and when in use, it is properly diluted as the case requires. However, such pure oxygen is expensive because it is usually prepared by a costly process such as a low temperature distillation processing. Further, it is known that highly pure or highly concentrated oxygen may sometimes be harmful when used for therapeutic purposes.

Under these circumstances, there have been proposed so-called oxygen-enriching membranes designed to separate and concentrate oxygen from the atmosphere. However, these membranes so far proposed, are not necessarily fully satisfactory because their oxygen separating ability is low or even if their initial performance is good, such good performance does not last. In order to increase the gas permeation flux, it is common in many cases that such a membrane for gas separation is laminated on a porous supporting member in a form of a thin film. Further, in order to overcome the possible defects of the thin film, a composite membrane having a laminated structure comprising three or more layers has been proposed, for instance in Japanese Unexamined Patent Publication No. 91708/1982 or No. 121485/1976. However, the membrane of this type does not have sufficient oxygen permeability, i.e. the capacity for treatment of the air. Accordingly, in order to obtain a substantial amount of enriched oxygen, a considerably large membrane surface area is required, which brings out disadvantages such that the apparatus will have to be enlarged, and yet the oxygen concentration will not necessarily be adequately high. Further, even with such a multi-layered structure, it is not necessarily possible to eliminate the defects of the membrane, and in many cases, no adequate durability will be obtained.

Under these circumstances, the present inventors have conducted various researches with an aim to obtain an oxygen-enriching membrane which is capable of efficiently separating and concentrating oxygen from the atmosphere and which has a superior durability. As a result, it has been found that such an object can be attained by providing a composite membrane having a certain specific three-layered structure as defined below.

Namely, the present invention provides a composite membrane for gas separation having a three-layered structure comprising:

(A) a porous supporting polymer membrane layer having a cross-sectional oxygen permeation flux of at least 5 m$^3$/m$^2$.hr.atm (STP) and having a porous structure such that the average pore diameter at one surface is from 5 to 500 Å and the average pore diameter at the other surface is greater than that at said one surface;

(B) a polyorganosiloxane layer having a thickness of from 300 Å to 5 μm; and (C) a thin layer having a thickness of from 100 to 5000 Å and made of a polymer containing monomer units of at least one monomer selected from the group consisting of fluoroolefin monomers and pivalate

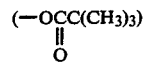

group-containing monomers, being soluble in an organic solvent and having an O$_2$/N$_2$ permeability coefficient ratio of at least 3.5;

said layer B contacting said one surface with the smaller pore diameter of the layer A, said layer C contacting the surface of the layer B, and the composite membrane having an oxygen permeation flux of at least 0.1 m$^3$/m$^2$.hr.atm (STP) and a O$_2$/N$_2$ permeation flux ratio of at least 2.5.

Now, the present invention will be described in detail with reference to the preferred embodiments.

The porous membrane to be used as the supporting layer in the present invention, is a so-called asymmetric porous membrane wherein the pores on one side are finner than the pores on the other side, i.e. the pores size distribution in the direction of the thickness of the membrane is not uniform. Further, the gas permeability of the porous membrane attributable to the physical properties such as the average pore diameter, the pore diameter distribution and the porosity, is required to satisfy certain specific conditions. Namely, one surface (i.e. the front surface) is required to have an average pore diameter of from 5 to 500 Å, the other surface (i.e. the rear surface) is required to have an average pore diameter greater than the pore diameter of the front surface, and the porous membrane is required to be a porous membrane having a cross-sectional oxygen permeation flux of at least 5 m$^3$(STP)/m$^2$.hr.atm (as measured under pressure around atmospheric pressure).

By virtue of the above-mentioned physical properties, it is possible to improve primarily the permselectivity and the treating capacity of the composite membrane and to stabilize the efficient performance of the composite membrane for a long period of time. If the above physical properties are not met, particularly if the average pore diameter on the front surface is large, some defects are likely to result in the layers B and C, or new defects are likely to result during the use of the composite membrane for a long period of time, whereby the permselectivity or durability of the composite membrane will be impaired. On the other hand, if the surface pore diameter is too small or the internal pore diameter distribution is not proper that the porous supporting membrane used does not provide the above-mentioned oxygen permeation flux, the composite membrane will not have an adequate gas-treating ability, and the permselectivity will be impaired by the adverse effect of so-called Knudsen diffusion within the porous supporting membrane.

It is particularly preferred to employ a porous supporting membrane having an average pore diameter of from 10 to 100 Å at its front surface and an oxygen permeation flux of at least 10 m$^3$/m$^2$.hr.atm, from the viewpoints of the initial performance and the durability of the composite membrane.

Such a porous membrane may be made of a material such as polysulfone, polyacrylonitrile or cellulose acetate. Among these, polysulfone is particularly preferred as the membrane to be used in the present invention, by reason of the easy control of the fine porous structure, the mechanical strength and the chemical stability.

Then, a polyorganosiloxane membrane is coated or laminated on the surface having the smaller average pore diameter, of the porous supporting membrane. As such a polyorgano-siloxane, there may be mentioned polydimethyl-siloxane, polydiphenylsiloxane, a fluoroalkyl group-containing polysiloxane, an amino group-containing polysiloxane or a polysiloxane-polycarbonate block copolymer. The molecular weights of these polyorganosiloxanes may be such that their polymerization degree is at least 100. However, in general, the higher the molecular weight, the greater the mechanical strength. On the other hand, with an increase of the molecular weight, the viscosity of the polyorganosiloxne solution increases. Accordingly, the molecular weight of the polyorganosiloxane is properly selected taking into account the type of the organosiloxane, the thickness of the polyorganosiloxane layer to be obtained, the concentration of the solution and the surface pore diameter of the porous supporting membrane.

Such a polyorganosiloxane preferably has an oxygen permeability coefficient ($PO_2$) of at least $5 \times 10^{-9}$ cc.cm/cm$^2$.sec.cmHg (STP) and a ratio ($\alpha$) of the $O_2/N_2$ permeability coefficient ratio of at least 1.5. Particularly preferred is the one having gas permeability characteristics of $PO_2$: at least $1 \times 10^{-8}$ and $\alpha$: at least 1.8. Further, for the selection of the polyorganosiloxane, it is advisable to take into account the affinity with the porous supporting membrane. From such a viewpoint, an amino group-containing polyorganosiloxane may be preferred. The type of the amino group is not critical, and it is possible to employ a primary, secondary or tertiary amino group. For instance, there may be mentioned aminopropyl, dimethyl aminopropyl or N-cyclohexyl aminopropyl.

Further, in some cases, it is possible to improve the mechanical strength or the durability of the polyorganosiloxane layer or the resulting three-layered composite membrane, by crosslinking such a polyorganosiloxane.

The thickness of the polyorganosiloxane layer is important as a factor governing the gas permeability and the durability of the resulting composite membrane. The thickness of the polyorganosiloxane layer is usually from 300 Å to 5 μm, preferably from 500 Å to 1 μm, although the thickness may be varied depending upon the type of the polyorganosiloxane.

If the thickness of the polyorganosiloxane layer is thinner than the above range, the composite membrane will have inadequate strength, and no adequate selectivity or durability will be obtained. On the other hand, if the thickness is too great, the gas permeation flux of the composite membrane with a highly permselective membrane coated thereon, will decrease and the selectivity will be impaired.

As to the process for the preparation of such a polyorganosiloxane layer, there is no particular restriction. For instance, as a typical process, there may be employed a method in which polyorganosiloxane is dissolved in an organic solvent, and the diluted solution thereby obtained is directly applied to the porous supporting membrane and dried, or a method in which such a solution is spread on the surface of water to form a thin layer, which is then applied to the porous supporting membrane. Further, in such an operation, the asymmetrical supporting membrane may be kept in a dried state or in a state wetted with e.g. water.

On such a polyorganosiloxane layer, a highly permselective membrane material is coated or laminated to form the layer C. The polymer substance forming such a thin layer is an important element of the present invention and is required to be a polymer having high permselectivity for gases and good film formability.

As a result of extensive studies on various monomers, the present inventors have found that a polymer which contains monomer units of at least one monomer selected from the group consisting of fluoroolefin monomers and pivalate

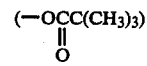

group-containing monomers and which is soluble in an organic solvent, is particularly superior as the material for the permselective thin layer. As the fluoroolefin monomers to be used, there may be mentioned tetrafluoroethylene, chlorotrifluoroethylene, vinylidene fluoride and vinyl fluoride. Among them, chlorotrifluoroethylene is particularly preferred in view of the gas permeability of the polymer material thereby obtained and the solubility in an organic solvent. As the pivalate group-containing monomers, there may be mentioned vinyl pivalate, cellulose monopivalate, cellulose dipivalate and cellulose tripivalate. As polymers composed of such monomers, there may be mentioned copolymers of fluoroolefins with various vinyl monomers and pivalate group-containing cellulose derivatives. Among them, copolymers of fluoroolefins with vinyl esters are preferred. Particularly preferred is a copolymer of chlorotrifluoroethylene with a vinyl ester such as vinyl pivalate. With respect to the copolymer composition of these copolymers of fluoroolefins with vinyl esters, if the fluoroolefin content is too high, the solubility in the solvent tends to decrease, such being undesirable. On the other hand, if the vinyl ester content is too high, the mechanical property of the copolymer thereby obtained, is likely to be impaired depending upon the type of the vinyl ester. Accordingly, with respect to the copolymer composition, it is desirable that the optimum molar ratio is selected from the viewpoints of the solubility, mechanical property and gas permeability of the copolymer, taking the types of the monomers into consideration. Among the physical properties of the polymer material, the gas permeability should preferably be such that the permeability coefficient is at least $1 \times 10^{-10}$ cc.cm/cm$^3$ sec.cmHg (STP), and the ratio of the oxygen permeability coefficient to the nitrogen permeability coefficient is at least 3.5. Particularly preferred is the one wherein the permeability coefficient is at least $5 \times 10^{-10}$ and the ratio of the oxygen permeability coefficient to the nitrogen permeability coefficient is at least 4.0.

The thickness of such a permselective thin layer (the layer C) is from 100 to 5000 Å, preferably from 200 to 1000 Å from the viewpoints of the gas permeation characteristics and durability of the composite membrane. If the thickness is less than this range, the composite membrane thereby obtained will have inadequate permselectivity or durability. On the other hand, if the thickness is too great, the permeation flux of the composite membrane will be inadequate.

As to the process for the preparation of such a permselective thin layer (the layer C), there is no particular restriction. For instance, the same processes as used for the preparation of the polyorganosiloxane layer may be employed. As a preferred method, there may be mentioned a method wherein a thin film obtained by the spreading method on the surface of water, is applied onto the polyorganosiloxane layer.

If desired, a non-woven fabric of e.g. polyester or polyolefin may further be provided on the surface having the larger pore diameter for the purpose of reinforcing the porous supporting membrane.

The composite membrane of the present invention is most suitable for use as a so-called oxygen-enriching membrane to concentrate oxygen in the atmosphere. However, its usefulness is not restricted to such a particular application, and it may be widely used for the purposes of separating or recovering hydrogen, helium, carbon monooxide, carbon dioxide or methane.

Now, the present invention will be described in further detail with reference to Examples. However, it should be understood that the present invention is by no means restricted by these specific Examples.

The physical properties of the composite membrane or the materials of the membrane were measured by usual method. As an index for the molecular weight of the polymer, the intrinsic viscosity of the polymer in tetrahydrofuran at 30° C. was used. The gas permeability of the composite membrane was measured by a pressure-imposing method wherein pressure (2 atms) was applied to the primary side while the secondary side was maintained under atmospheric pressure.

EXAMPLE 1

An asymmetric porous supporting membrane (total thickness: 240 μm) of polysulfone UK 10 (Toyo Roshi Co., Ltd.) (oxygen permeation flux in dry state: 90 m$^3$/m$^2$.hr atm) having a front surface pore diameter of about 50 Å and a rear surface pore diameter of about 1 μm and backed with a polyester non-woven fabric, was used, and a 0.5% trichlorotrifluoroethane solution of polydimethylsiloxane (polymerization degree: 1000) was applied thereto and dried to obtain a composite membrane. The composite membrane thus obtained, had a polysiloxane layer having a thickness of 1.0 μm, and showed an oxygen permeation flux $QO_2=1.4$ m$^3$/m$^2$.hr.atm (STP) and a $O_2/N_2$ permiation flux ratio $\alpha=2.0$.

A thin layer (average thickness: 150 Å) of a propylene/vinyl pivalate copolymer (molar ratio: 10.2/89.8, intrinsic viscosity: 0.53) prepared by a casting-on-water method, was laminated four times on the above composite membrane to obtain a three-layered composite membrane. The composite membrane thus obtained, showed $QO_2=0.2$ m$^3$/m$^2$.hr.atm and $\alpha=3.8$. This composite membrane was used continuously for one month under 2.0 atm., and then the gas permeability was measured again, whereby the membrane showed $QO_2=0.18$ m$^3$/m$^2$.hr.atm and $\alpha=3.9$, thus indicating good durability.

EXAMPLE 2

With use of the same polysulfone asymmetric porous supporting membrane as used in Example 1, a polysiloxane layer (thickness: 0.3 μm) of an amino group-containing polydimethylsiloxane (aminopropyl group/Si molar ratio: 0.01, polymerization degree: 5000) was laminated thereon to obtain a composite membrane. This composite membrane showed $QO_2=4.9$ m$^3$/m$^2$.hr.atm and $\alpha=2.1$.

A thin layer of a chlorotrifluoroethylene/vinyl pivalate copolymer (chlorotrifluoroethylene/vinyl pivalate molar ratio: 41.0/59.0, intrinsic viscosity: 1.4) was coated on the above composite membrane to obtain a three-layered composite membrane. This composite membrane showed $QO_2=0.62$ m$^3$/m$^2$.hr.atm and $\alpha=4.2$ as the initial properties. The durability of this composite membrane is shown in Table 1.

TABLE 1

| Durability of Three-layered Composite Membrane | | | | |
|---|---|---|---|---|
| Durability test conditions | Initial properties | After 1 month operation | After 2 month operation | After 3 month operation |
| Primary side pressure 20 atm (G) | $QO_2 = 0.62$ | $QO_2 = 0.60$ | $QO_2 = 0.58$ | $QO_2 = 0.59$ |
| Secondary side pressure 0 atm (G) | $\alpha = 4.2$ | $\alpha = 4.3$ | $\alpha = 4.4$ | $\alpha = 4.3$ |
| Temperature 23.0–26.2° C. | | | | |

COMPARATIVE EXAMPLE 1

A three-layered composite membrane was prepared in the same manner as in Example 2 except that a symmetric polypropylene membrane (pore diameter: about 1000 Å, membrane thickness: about 25 μm, $QO_2=2300$ m$^3$/m$^2$.hr.atm) was used as the porous supporting layer. The gas permeabilities of the polysiloxane composite membrane and the three-layered composite membrane are shown in Table 2.

TABLE 2

| Permeabilities of Composite Membranes (Symmetric porous supporting membrane) | | |
|---|---|---|
| | Polysiloxane composite membrane | Three-layered composite membrane |
| $QO_2$ | 23.5 m$^3$/m$^2$ · hr · atm | 1.8 m$^3$/m$^2$ · hr · atm |
| $\alpha$ | 1.3 | 2.2 |

COMPARATIVE EXAMPLE 2

A three-layered composite membrane was prepared in the same manner as in Example 2 except that a symmetric polyacrylonitrile membrane (pore diameter: about 200 Å, membrane thickness: 50 μm, $QO_2=250$ m$^3$/m$^2$.hr.atm) was used as the porous supporting layer. The gas permeabilities of the polysiloxane composite membrane and the three-layered composite membrane are shown in Table 3.

TABLE 3

| Permeabilities of Composite Membranes (Symmetric porous supporting membrane) | | |
|---|---|---|
| | Polysiloxane composite membrane | Three-layered composite membrane |
| | | (Initial) / (After 1 month operation) |
| $QO_2$ | 5.2 m$^3$/m$^2$ · hr · atm | 1.3 / 4.6 |
| $\alpha$ | 1.5 | 3.2 / 2.1 |

EXAMPLE 3

On the same polysulfone asymmetric porous supporting membrane as used in Example 1, a polysiloxane layer of the same amino group-containing polydimethylsiloxane as used in Example 2 was laminated in a thickness of 0.5 μm to obtain a composite membrane. This composite membrane showed $QO_2=2.9$ m$^3$/m$^2$.hr.atm and $\alpha=2.0$.

On the composite membrane, a thin layer of a chlorotrifluoroethylene/vinyl butyrate copolymer (chlorotrifluoroethylene/vinyl butyrate molar ratio: 49/51) was further coated to obtain a three-layered composite membrane. This composite membrane showed $QO_2 = 0.51$ m$^3$/m$^2$.hr.atm and $\alpha = 3.8$ as the initial properties. Further, this composite membrane had good durability as shown in Table 4.

TABLE 4

Durability of Three-layered Composite Membrane

| Conditions for the measurement: | |
| --- | --- |
| Primary Side Pressure: | 2 atm G |
| Secondary Side Pressure: | 0 atm G |
| Temperature: | 20–25° C. |

| Permeability of the membrane: | | | |
| --- | --- | --- | --- |
| | Initial | After 1 month operation | After 2 month operation |
| QO$_2$ (m$^3$/m$^2$ · hr · atm) | 0.51 | 0.50 | 0.50 |
| α (—) | 3.8 | 3.9 | 3.9 |

We claim:

1. A composite membrane for gas separation having a three-layered structure comprising:

(A) a porous polymer supporting membrane layer having a cross-sectional oxygen permeation flux of at least 5 m$^3$/m$^2$.hr.atm (STP) and having a porous structure such that the average pore diameter at one surface is from 5 to 500 Å and the average pore diameter at the other surface is greater than that at said one surface;

(B) a polyorganosiloxane layer having a thickness of from 300 Å to 5 μm; and (C) a thin layer having a thickness of from 100 to 5000 Å and made of a polymer containing monomer units of at least one monomer selected from the group consisting of fluoroolefin monomers and pivalate

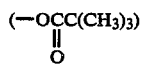

group-containing monomers, being soluble in an organic solvent and having an O$_2$/N$_2$ permeability coefficient ratio of at least 3.5;

said layer B contacting said one surface with the smaller pore diameter of the layer A, said layer C contacting the surface of the layer B, and the composite membrane having an oxygen permeation flux of at least 0.1 m$^3$/m$^2$.hr.atm (STP) and a O$_2$/N$_2$ permeation flux ratio of at least 2.5.

2. The composite membrane according to claim 1, wherein the porous supporting polymer membrane layer comprises a polysulfone, polyacrylonitrile or cellulose acetate membrane.

3. The composite membrane according to claim 1, wherein the polyorganosiloxane is an amino group-containining polyorganosiloxane.

4. The composite membrane according to claim 1, wherein the polyorganosiloxane is cross-linked.

5. The composite membrane according to claim 1, wherein said thin layer C is made of a copolymer of a fluoroolefin and a vinyl ester.

6. The composite membrane according to claim 1, wherein the fluoroolefin is chlorotrifluoroethylene.

7. The composite membrane according to claim 1, wherein at least one of the layers B and C is formed by spreading an organic solvent solution of the respective polymer on the surface of water.

8. The composite membrane according to claim 1, wherein at least one of the layers B and C is obtained by applying an organic solvent solution of the respective polymer to the surface of the layer A or the layer B, followed by drying.

9. The composite membrane of claim 1 wherein the average pore diameter of membrane layer (A) at the one surface with the smaller pore diameter is 10 to 100 Å, and its oxygen permeation flux is at least 10 m$^3$/m$^2$.hr.atm, wherein the oxygen permeability coefficient (PO$_2$) of the polyorganosiloxane layer (B) is at least 5×10$^{-9}$ cc.cm/cm$^2$.sec.cmHg (STP) and its O$_2$/N$_2$ permeability ratio is at least 1.5, and its thickness is 500 Å to 1 μm and wherein the thickness of layer (C) is 200 to 1000 Å.

* * * * *